(12) United States Patent
Nelias et al.

(10) Patent No.: US 7,673,574 B2
(45) Date of Patent: Mar. 9, 2010

(54) MULTIMATERIAL STITCHING SKINS PREPARATION

(75) Inventors: Francois Nelias, Croix (FR); Alain Choquet, Lesquin (FR)

(73) Assignee: Visteon Global Technologies, Inc., Van Buren Township, MI (US)

( * ) Notice: Subject to any disclaimer, the term of this patent is extended or adjusted under 35 U.S.C. 154(b) by 122 days.

(21) Appl. No.: 11/957,113

(22) Filed: Dec. 14, 2007

(65) Prior Publication Data

US 2008/0145604 A1 Jun. 19, 2008

(30) Foreign Application Priority Data

Dec. 15, 2006 (FR) .................................. 06 10931

(51) Int. Cl.
*D05B 35/02* (2006.01)
*D05B 35/00* (2006.01)

(52) U.S. Cl. .............................. 112/475.06; 112/475.08

(58) Field of Classification Search ................. 112/141, 112/147–153, 475.06, 475.08, 475.09; 156/93
See application file for complete search history.

(56) References Cited

U.S. PATENT DOCUMENTS

| 5,573,617 | A | * | 11/1996 | Franck et al. | ................ | 156/196 |
| 5,669,670 | A | * | 9/1997 | Haraguchi et al. | ..... | 297/452.61 |
| 5,961,019 | A | * | 10/1999 | Gleason et al. | ............. | 224/643 |
| 6,116,175 | A | * | 9/2000 | Ito | ......................... | 112/475.06 |
| 6,505,570 | B1 | * | 1/2003 | Sakamoto et al. | ....... | 112/470.27 |
| 6,935,260 | B2 | * | 8/2005 | Kromm et al. | .......... | 112/475.08 |
| 6,997,126 | B2 | * | 2/2006 | Murley | ................... | 112/475.06 |

FOREIGN PATENT DOCUMENTS

| DE | 102 14 235 A1 | 10/2003 |
| DE | 10 2004 053133 A1 | 5/2006 |
| JP | 2002 301977 A | 10/2002 |
| JP | 2005 328991 A | 12/2005 |

\* cited by examiner

*Primary Examiner*—Ismael Izaguirre
(74) *Attorney, Agent, or Firm*—Fraser Clemens Martin & Miller LLC; J. Douglas Miller

(57) ABSTRACT

The subject matter of the present invention is a method for joining at least two portions or sections of clothing or covering materials in the form of pieces of flexible skins, the materials of the two pieces of skin having a similar or different thickness and/or rigidity or folding stiffness, the join being formed between and along two edges folded opposite one another and in contact end to end of said pieces of skin, so as to form a joining line.

17 Claims, 3 Drawing Sheets

FIG. 2
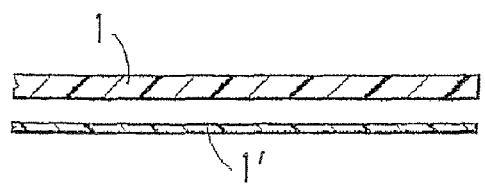
FIG. 2A
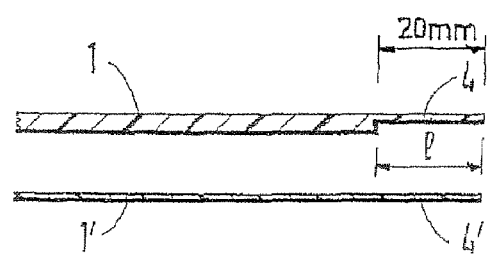
FIG. 2B
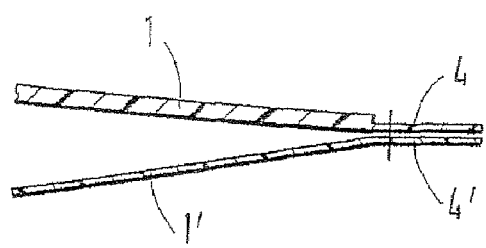
FIG. 2C
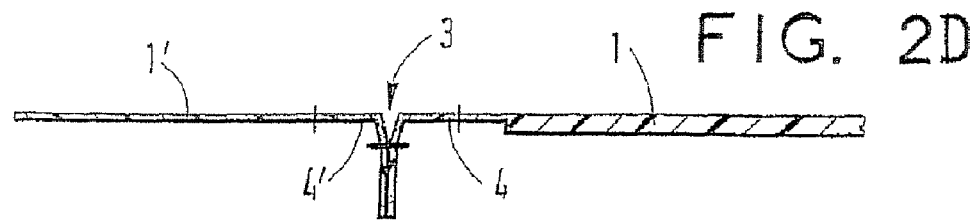
FIG. 2D
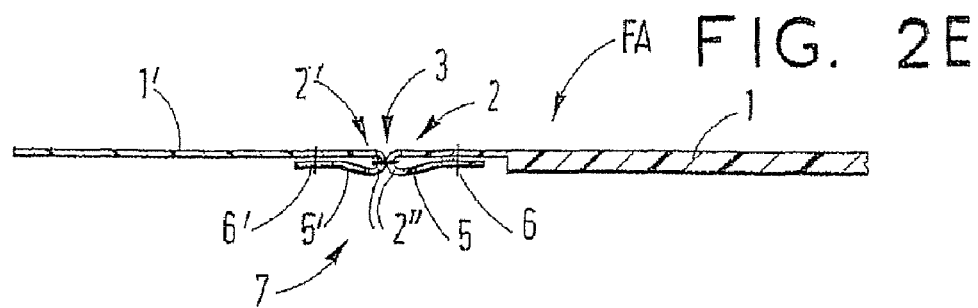
FIG. 2E FIG. 3
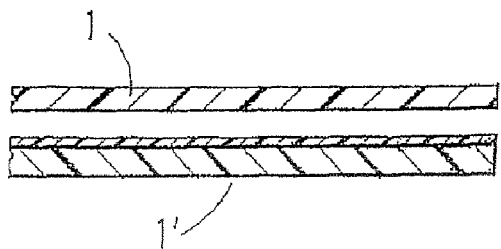
FIG. 3A
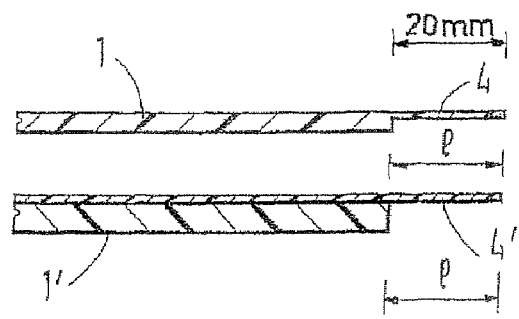
FIG. 3B
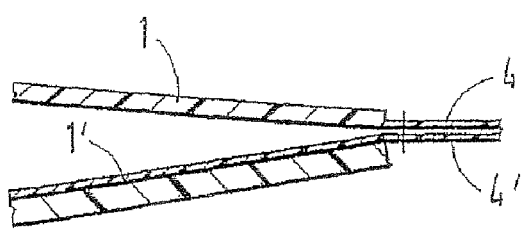
FIG. 3C
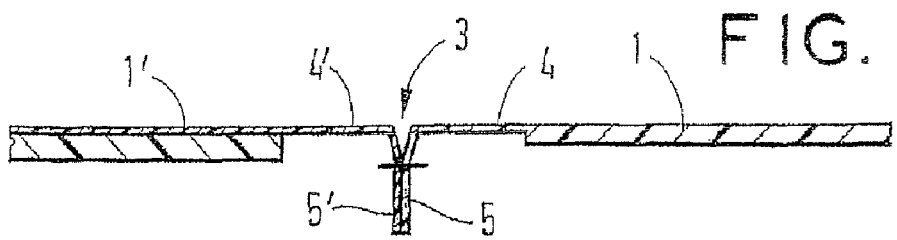
FIG. 3D
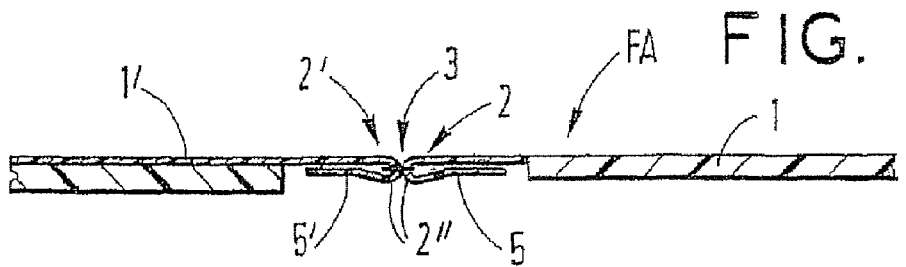
FIG. 3E

MULTIMATERIAL STITCHING SKINS PREPARATION

CROSS-REFERENCE TO RELATED APPLICATION

This application claims the benefit of French Patent Application No. 06 10931 entitled MULTIMATERIAL STITCHING SKINS PREPARATION filed on Dec. 15, 2006, hereby incorporated herein by reference in its entirety.

FIELD OF THE INVENTION

The present invention relates to the field of producing articles or pieces integral to the element forming the visible surface, or at least a section of the latter, a surface material that is single or multilayered with the constitution of skin.

BACKGROUND OF THE INVENTION

The present invention relates more particularly to the production of articles or pieces having a covering material consisting of several (at least two) skins of different natures, types constitutions, or different properties.

Its subject matter is a method for joining at least two pieces of different skins, a method for producing an article or component comprising a composite skin and an article or component obtained in this way.

The essential aim of the invention is to improve the aesthetic appearance and the regularity of a joining line or the joint between two pieces of skin with different and/or non-uniform characteristics.

However, when such a composite skin (formed by joining several pieces of skin) is subjected to constrictions, pressure, or tension, particularly during subsequent perfecting procedures, fixing or installing, irregularities and faults are revealed along the linear join area and these reduce the aesthetic appearance of the interface between the two pieces of skin concerned.

Two types of faults can be highlighted: the presence of discontinuity in the structure of the interface in its longitudinal extension (resulting for example from structural discontinuities along the edge of one of the two pieces of skin) and a difference in aspect and/or uncoupling between the two juxtaposed edges at the level of the interface (see FIG. 1).

The problem addressed by the present invention is to propose a solution which makes it possible to eliminate at least the first kind of said fault, and if possible, also the second.

To this effect, the subject matter of the invention is a method for joining at least two portions or sections of clothing or covering materials in the form of pieces of flexible skins, the materials of the two pieces of skin to be joined, as necessary on each occasion, having a similar or different thickness and/or rigidity or folding stiffness, the joining being carried out between and along two edges folded opposite one another and in contact end to end of said pieces of skin, so as to form a joining line, the method being characterized in that it comprises, prior to the formation of the folded edges to be joined and prior to the joining itself, treating at least one or each border edge that is to form a folded edge of one of the two pieces of skin so as to level out its thickness and/or its rigidity or flexibility over the entire longitudinal extension of the border edge(s) concerned, if necessary, by adjusting or adapting it to the thickness and/or the rigidity or flexibility of the other piece of skin to the level of its respective border edge.

SUMMARY OF THE INVENTION

In one embodiment, the method for joining pieces of flexible skin comprises the steps of providing a first piece of flexible skin and a second piece of flexible skin to be joined; treating at least one border edge of at least one of the first piece of flexible skin and the second piece of flexible skin to be joined to provide a treated edge of the first piece of flexible skin and the second piece of flexible skin to be joined having at least one of a substantially equal thickness and a substantially similar flexibility; and joining the first piece of flexible skin and the second piece of flexible skin along a first folded edge formed on the first piece of flexible skin and a second folded edge formed on the second piece of flexible skin, one of the first folded edge and the second folded edge including at least a portion of the treated edge.

In another embodiment, the method for joining pieces of flexible skin comprises the steps of providing a first piece of flexible skin and a second piece of flexible skin to be joined; treating at least one border edge of at least one of the first piece of flexible skin and the second piece of flexible skin to be joined to provide a treated edge of the first piece of flexible skin and the second piece of flexible skin to be joined having at least one of a substantially equal thickness and a substantially similar flexibility; and joining the first piece of flexible skin and the second piece of flexible skin along a first folded edge formed on the first piece of flexible skin and a second folded edge formed on the second piece of flexible skin to form a joining line, one of the first folded edge and the second folded edge including at least a portion of the treated edge, wherein the joining step is one of stitching, adhesion, and welding.

In another embodiment, the covering material for an inside of an automobile comprises a first piece of flexible skin; and a second piece of flexible skin joined with the first piece of flexible skin along a first folded edge formed on the first piece of flexible skin and a second folded edge formed on the second piece of flexible skin, wherein at least one border edge of at least one of the first piece of flexible skin and the second piece of flexible skin includes a treated edge to facilitate the first piece of flexible skin and the second piece of flexible skin having at least one of a substantially equal thickness and a substantially similar flexibility, one of the first folded edge and the second folded edge including at least a portion of the treated edge.

BRIEF DESCRIPTION OF THE DRAWINGS

The invention can be better understood by referring to the following description, which relates to preferred embodiments, given as non-restrictive examples, and explained with reference to the attached schematic drawings, in which:

FIGS. 2A to 2E are transverse cross sections illustrating different stages of a first variant of the method of joining according to the invention; and FIGS. 3A to 3E are transverse cross sections illustrating different stages of a second embodiment of the joining method according to the invention.

DETAILED DESCRIPTION OF THE INVENTION

Figure 1:
FIG. 1 is a side sectional view of a an interface according to the prior art.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 2 and 3 of the attached drawings illustrate a method for joining at least two portions or parts of clothing or covering materials 1 and 1' in the form of pieces of flexible skin.

The materials of the two pieces of skin 1 and 1' to be joined together (as required each time) have thicknesses and/or rigidities or folding flexibilities that are similar or different, the joining being performed between and along the two folded edges 2 and 2' opposite one another and in contact end to end of said pieces of skin, so as to form a joining line 3, preferably not visible at the level of the visible surface FA of the resulting composite skin 7.

According to the invention, this method consists, prior to the formation of the folded edges 2, 2' to be joined and prior to the joining operation itself of treating at least one or each border edge 4, 4' intended to form a folded edge 2, 2' of one of the two pieces of skin 1, 1', so as to level its thickness and/or its rigidity or flexibility over the entire longitudinal extension of the border edge(s) 4, 4' concerned, depending on the case, by adjusting or adapting it to the thickness and/or the rigidity or flexibility of the other piece of skin 1', 1 to the level of its respective border edge 4', 4.

Each of the pieces of skin 1, 1' can have a homogenous or stratified structure in several layers and can be made from a natural or synthetic material or even a mixture of these two types of materials.

By way of the above method it is therefore at least possible to calibrate the thickness or the characteristics of rigidity, flexibility or resistance to bending or folding of the border edges 4 and 4' of the two pieces of skin 1 and 1' to be joined together.

Thus, the invention makes it possible to avoid dispersions that are inherent to the covering materials joined together and therefore improve considerably the consistency of the appearance and profile of the connection to the linear extension between the two pieces of skin 1 and 1'.

In particular, the invention makes it possible to guarantee a constant radius of curvature of the folded edges 2 and 2' all along the joining line 3, or possibly variable but in a controlled manner.

The passage between the treated border edge 4, 4' of one piece of skin 1, 1 and the section that remains untreated of the latter can be abrupt (FIGS. 2 and 3) or progressive (progressive reduction in the intensity of the leveling treatment at the level of the inner edge of the border edge concerned).

Moreover, it is possible to vary the intensity of the leveling treatment over the width of the border edge 4, 4' concerned, for example by increasing it from the inner edge to the outer edge of said border.

Advantageously, the leveling treatment produces a border edge 4, 4' of the piece or pieces of skin 1, 1' concerned, the width 1 of which is at least twice the width of the section 5, 5' folded back from said border edge 4, 4'.

In order to achieve a particular aesthetic effect in the form of unhooking or a calibrated step extending in a visible manner along the line of the join 3, the leveling treatment is parameterised such that the front parts come into contact with two folded edges 2 and 2' naturally forming identical radii of curvature after treatment.

According to a first embodiment shown in FIG. 2 of the attached drawings, the leveling treatment only relates to the border edge 4 of one 1 of the two pieces of skin 1 and 1' to be joined together, namely the piece of skin 1 with the greatest thickness and/or resistance to folding.

According to a second embodiment shown in FIG. 3 of the attached drawings, the leveling treatment relates to the border edges 4 and 4' of two pieces of skin 1 and 1' to be joined together, the intensity or the calibration of said treatment being normally different for the said two pieces of skin 1 and 1'.

Although other types of treatment can be considered the leveling treatment consists preferably of a mechanical or physical treatment, in particular removing material or compression at the level of the border edge 4, 4' concerned (cut out by means of a rotary blade, smoothing, brushing, grooving, crushing, shaping, . . . ).

The joining of the two folded back edges 2 and 2' can be performed advantageously either by stitching or by adhesion or welding, along their front areas bent opposite one another, the folded back parts 5 and 5' of the border edges 4 and 4' being respectively joined to the non-visible surfaces of the pieces of skin 1 and 1', for example by means of an adhesive agent, a line of stitching 6 or a welding line or the like.

The effective joining line, at the level of which the connection between the two folded edges 2 and 2' is formed, is not visible (on the surface FA), only the resulting groove is visible forming the visible joining line 3.

In a more precise manner and as illustrated in FIGS. 2A to 2E and 3A to 3E, the method consists of supplying firstly the two pieces of skin 1 and 1' that are cut in a suitable manner (allowing for the area lost by folding back the edges) and after treatment of the border edges 4, 4' of the pieces of skin 1, 1' or one of the pieces of skin to be joined for the purposed of leveling its (their) thickness and/or rigidity its/their entire length, of producing a longitudinal joint between the two border edges 4 and 4' along an almost median line for each of these two border edges 4, 4', then folding back each of the parts 5, 5' of these border edges 4, 4' situated beyond the joining line 3 over about 360°, and lastly attaching them to the corresponding surface of the piece of skin 1, 1' concerned so as to form the folded back edges 2, 2'.

The method described above can be repeated for each pair or parts or pieces of skin 1 and 1' to be joined. Thus, the same piece or part of skin 1, 1' can be treated or prepared differently depending on the area of the border 4, 4' to be joined to another section or piece of skin, and the characteristics of the other section or piece of skin to be joined each time. This treatment or this preparation will also make it possible to facilitate the stitching process.

The subject matter of the present invention is also a method of producing an article or a structural and/or functional component, in particular an element of interior equipment for the inside of an automobile, comprising on its visible surface a skin formed by the juxtaposition of at least two pieces of skin with different thicknesses and/or rigidities, the method being characterized in that it consists of forming the skin 7 by joining of at least two pieces of skin 1 and 1' of a different nature or with different characteristics, by using the method described above, then either of forming a substrate over the non-visible surface of the skin 7 by forming or applying the skin 7 by surface joining onto an already formed substrate.

Lastly, the invention also relates to an article or structural and/or functional component formed by at least one skin and substrate, characterized in that it is obtained by means of the method of production described above.

Of course, the invention is not restricted to the embodiments described and illustrated in the attached drawings. Modifications are possible, particularly in relation to the structure of the various elements or by substituting equivalent techniques, without departing from the scope of protection of the invention.

What is claimed is:

1. A method for joining pieces of flexible skin, the method comprising the steps of:
    providing a first piece of flexible skin and a second piece of flexible skin to be joined;
    treating a non-visible surface of at least one border edge of at least one of the first piece of flexible skin and the second piece of flexible skin to be joined using a leveling treatment to provide a treated edge of the first piece of flexible skin and the second piece of flexible skin to be joined having at least one of a substantially equal thickness and a substantially similar flexibility;
    joining the first piece of flexible skin and the second piece of flexible skin along a first folded edge formed on the first piece of flexible skin and a second folded edge formed on the second piece of flexible skin, one of the first folded edge and the second folded edge including at least a portion of the treated edge;
    disposing at least one of a folded back part of the first folded edge against the non-visible surface of the first piece of flexible skin and a folded back part of the second folded edge against the non-visible surface of the second piece of flexible skin; and
    joining at least one of the folded back part of the first folded edge to the non-visible surface of the first piece of flexible skin and the folded back part of the second folded edge to the non-visible surface of the second piece of flexible skin.

2. The method according to claim 1, wherein a width of the treated edge is at least twice a width of a width of one of the first folded edge and the second folded edge.

3. The method according to claim 1, wherein a curvature of a folded portion of the first folded edge is substantially equal to a curvature of a folded portion of the second folded edge.

4. The method according to claim 1, further comprising the step of treating a border edge of the first piece of flexible skin and a border edge of the second piece of flexible skin.

5. The method according to claim 4, wherein the leveling treatment for the border edge of the first piece of flexible skin is different from the treating step for the border edge of the second piece of flexible skin.

6. The method according to claim 1, wherein the leveling treatment includes a removal of material.

7. The method according to claim 1, wherein the leveling treatment includes a compression of material.

8. The method according to claim 1, wherein the joining step further comprises the step of stitching along a front area of the first folded edge and the second folded edge.

9. The method according to claim 1, wherein an adhesive agent is disposed between the folded back parts of the first folded edge and the second folded edge and the non-visible surfaces of the first piece of skin and the second piece of skin.

10. A method for joining pieces of flexible skin, the method comprising the steps of:
    providing a first piece of flexible skin and a second piece of flexible skin to be joined;
    treating a non-visible surface of at least one border edge of the first piece of flexible skin and the second piece of flexible skin to be joined using a leveling treatment to provide a treated edge of the first piece of flexible skin and the second piece of flexible skin to be joined having at least one of a substantially equal thickness and a substantially similar flexibility, wherein the leveling treatment for the border edge of the first piece of flexible skin is different from the leveling treatment for the border edge of the second piece of flexible skin; and
    joining the first piece of flexible skin and the second piece of flexible skin along a first folded edge formed on the first piece of flexible skin and a second folded edge formed on the second piece of flexible skin to form a joining line, one of the first folded edge and the second folded edge including at least a portion of the treated edge, wherein the joining step is one of stitching, adhesion, and welding.

11. The method according to claim 10, wherein a width of the treated edge is at least twice a width of a width of one of the first folded edge and the second folded edge.

12. The method according to claim 10, wherein a curvature of a folded portion of the first folded edge is substantially equal to a curvature of a folded portion of the second folded edge.

13. The method according to claim 10, wherein the leveling treatment includes at least one of a removal of material and a compression of material.

14. A covering material for an inside of an automobile comprising:
    a first piece of flexible skin; and
    a second piece of flexible skin joined with the first piece of flexible skin along a first folded edge formed on the first piece of flexible skin and a second folded edge formed on the second piece of flexible skin, wherein a non-visible surface of at least one border edge of at least one of the first piece of flexible skin and the second piece of flexible skin includes a treated edge to facilitate the first piece of flexible skin and the second piece of flexible skin having at least one of a substantially equal thickness and a substantially similar flexibility, one of the first folded edge and the second folded edge including at least a portion of the treated edge, wherein at least one of a folded back part of the first folded edge is joined to the non-visible surface of the first piece of flexible skin and a folded back part of the second folded edge is joined to the non-visible surface of the second piece of flexible skin.

15. The covering material according to claim 14, wherein a curvature of a folded portion of the first folded edge is substantially equal to a curvature of a folded portion of the second folded edge.

16. The covering material according to claim 14, wherein the treated edge is formed by one of a removal of material and a compression of material.

17. The covering material according to claim 14, wherein a border edge of both the first piece of flexible skin and the second piece of flexible skin include a treated edge.

* * * * *